(12) United States Patent
Weichmann et al.

(10) Patent No.: US 8,998,455 B2
(45) Date of Patent: Apr. 7, 2015

(54) METHOD OF MANUFACTURING A PART OF A COLOR RING AND A PART OF A COLOR RING

(75) Inventors: Ulrich Weichmann, Eindhoven (NL); Yuri Aksenov, Eindhoevn (NL); Johannes Baier, Eindhoven (NL); Jan Renier Marie Hochstenbach, Eindhoven (NL); Uwe Mackens, Eindhoven (NL); Joachim Opitz, Eindhoven (NL); Peter Josef Schmidt, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/990,091

(22) PCT Filed: Nov. 23, 2011

(86) PCT No.: PCT/IB2011/055257
§ 371 (c)(1),
(2), (4) Date: May 29, 2013

(87) PCT Pub. No.: WO2012/077008
PCT Pub. Date: Jun. 14, 2012

(65) Prior Publication Data
US 2013/0242536 A1 Sep. 19, 2013

(30) Foreign Application Priority Data
Dec. 7, 2010 (EP) .................................... 10193916

(51) Int. Cl.
*F21S 8/10* (2006.01)
*F21V 9/08* (2006.01)
(Continued)

(52) U.S. Cl.
CPC ................. *F21V 9/08* (2013.01); *C04B 37/006* (2013.01); *C09K 11/0883* (2013.01);
(Continued)

(58) Field of Classification Search
CPC ....... F21Y 2101/02; F21V 9/16; F21V 11/00;
F21V 9/08; F21W 2101/02; G21K 4/00;
H04N 9/3197; H04N 9/3114; H01K 1/32;
H01J 61/40; H01L 33/501; H01L 33/504;
H01L 33/502; C09K 11/08; C09K 11/0883
USPC ........... 362/84, 317, 293, 35; 264/21; 353/84;
313/112; 257/98
See application file for complete search history.

(56) References Cited

U.S. PATENT DOCUMENTS 6,520,644 B1 * 2/2003 Lee .................................. 353/31
6,824,283 B2 * 11/2004 Pohlert et al. .................... 362/11
(Continued)

FOREIGN PATENT DOCUMENTS

EP 2407826 A1 2/2012
KR 20080018782 A 2/2008
(Continued)

*Primary Examiner* — Anh Mai
*Assistant Examiner* — Glenn Zimmerman

(57) ABSTRACT

A method 200 of manufacturing a (part of) color ring is provided. The color ring converts a color of light emitted by a light emitter into at least one other color. The method (200) comprising the steps of: i) pressing (102) a first ring body of a first granulated precursor comprising a first luminescent material for converting the color of the light of the light emitter into a first one of the at least one other color, and ii) sintering (104) the first ring body for obtaining a first ceramic ring. The color ring comprises at least a segment of the first ceramic ring. Further, the method may comprises the steps of: iii) pressing (208) a second ring body of a second granulated precursor, wherein the first luminescent material is absent, iv) sintering (210) the second ring body for obtaining a second ceramic ring, v) segmenting (206) the first ceramic rings in at least two parts and segmenting (212) the second ceramic ring in at least two parts, and vi) forming (214) at least a part of the color ring by coupling a part of the first ceramic ring and a part of the second ceramic ring.

12 Claims, 7 Drawing Sheets

(51) Int. Cl.
  *C04B 37/00* (2006.01)
  *C09K 11/08* (2006.01)
  *C09K 11/77* (2006.01)
  *G03B 21/20* (2006.01)

(52) U.S. Cl.
  CPC ........ *C09K 11/7734* (2013.01); *C09K 11/7774* (2013.01); *G03B 21/204* (2013.01); *C04B 2235/9661* (2013.01); *C04B 2237/12* (2013.01); *C04B 2237/343* (2013.01); *C04B 2237/366* (2013.01); *C04B 2237/368* (2013.01); *C04B 2237/64* (2013.01); *C04B 2237/76* (2013.01); *C04B 2237/78* (2013.01)

(56) References Cited

U.S. PATENT DOCUMENTS

| | | |
|---|---|---|
| 7,547,114 B2 | 6/2009 | Li et al. |
| 7,651,243 B2 * | 1/2010 | McGuire et al. .............. 362/293 |
| 2008/0211971 A1 | 9/2008 | Pradhan |
| 2009/0187234 A1 * | 7/2009 | Meyer et al. .................... 607/88 |
| 2010/0315604 A1 * | 12/2010 | Peeters et al. ................... 353/84 |

FOREIGN PATENT DOCUMENTS

| | | |
|---|---|---|
| WO | 20070141688 A1 | 12/2007 |
| WO | 2009/047683 A2 | 10/2008 |
| WO | WO 2009069010 A1 * | 6/2009 |
| WO | 2010/084451 A1 | 7/2010 |

* cited by examiner

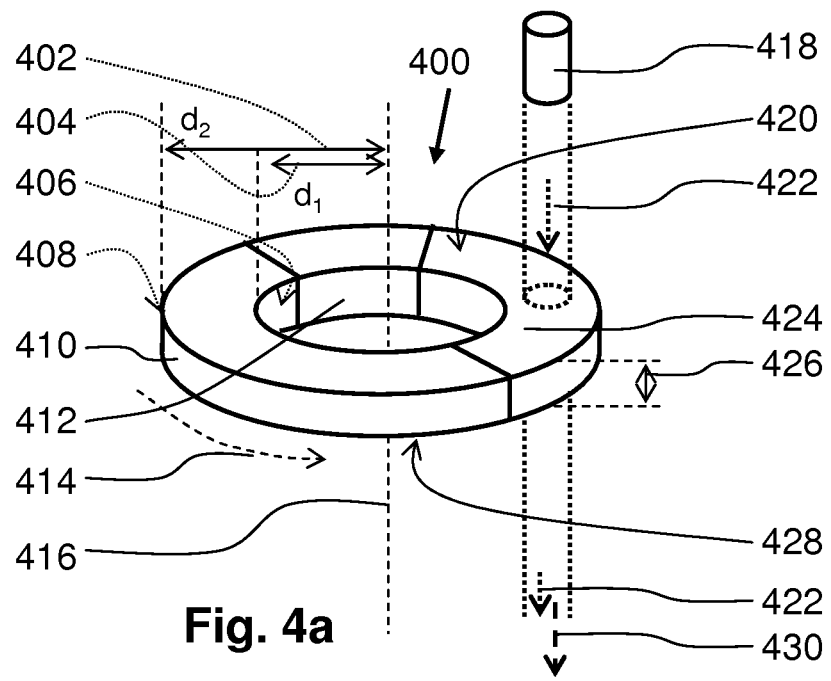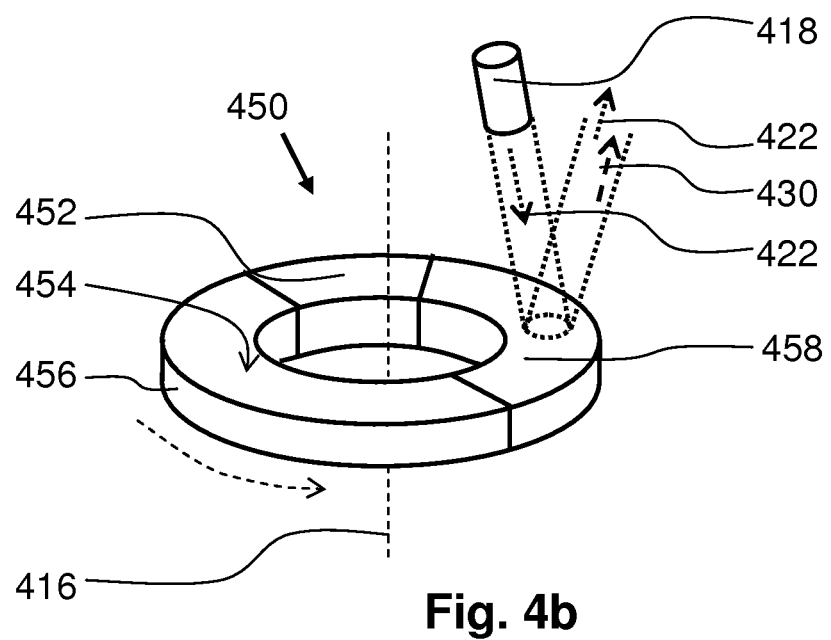

100

100

METHOD OF MANUFACTURING A PART OF A COLOR RING AND A PART OF A COLOR RING

FIELD OF THE INVENTION

The invention relates to the field of rotatable color conversion elements for light sources. Such light sources often comprise a single light emitting element which emits light of a first color. The rotatable color conversion element is used to convert the first color to one or more other colors in a time multiplexed way. The generation of different primary colors in a time multiplexed way is advantageous in image projection devices.

BACKGROUND OF THE INVENTION

Published patent application WO2007/141688A1 discloses several embodiments of a color conversion element which may be used in a light source. A subset of the embodiments of the cited patent application relates to a color wheel comprising different sections. One of the sections is transparent or reflective and does not convert the color of the light which is transmitted or reflected through the color wheel. One or more other sections of the color wheel each comprise a luminescent material which converts the color of the transmitted or reflected light to another color. The light originates from a light emitter which emits light of a single color. The luminescent material or materials are chosen such that the light which is emitted by the light source is perceived by humans as light having a specific color distribution that is different from the color of the light emitter of the light source. The color wheel rotates in a light beam emitted by the light source and as such different colors of light are emitted successively in time. Due to the high speed of succession of the different colors humans perceive the emitted light as a light having the specific color distribution.

The color wheel has a disk shape and is subdivided in sections. Each section has a corner at the center of the color wheel and covers a certain angular distance of the imaginary circle formed by the outer edge of the color wheel. Multiple sections are combined to form the color wheel. The color wheel may have a small hole in the center. As shown in the figures, the diameter of the light beam is relatively small compared to the radius of the color wheel and, thus, a significant part of the color wheel is not used when converting the color of the light.

Besides the well-known use of phosphors in a dye, the color wheel of the cited patent application may be made of crystalline inorganic luminescent materials which are sintered into a light transmitting ceramic body. A disclosed manufacturing method of the color wheel is that the sections have to be manufactured first and that they have to be glued together. With respect to the manufacturing of the ceramic material only the general process of sintering has been mentioned.

The sections of the color wheel are relatively large and as such it is relatively expensive to manufacture the sections. Further, the shape of the sections must be very accurate because the color wheel cannot have any gaps between the sections. Basically two manufacturing methods are possible, either the ceramic sections are cut out of a plate of the ceramic luminescent material or the sections are directly manufactured at their required shape. When cutting out of a plate, a relatively large part of the plate is not used and, thus, wasted. Further, cutting out the section of a plate is a step which costs a lot of time and must be performed with very accurate, and thus expensive, cutting tools. When the sections have to be manufactured directly at their required shape, for example, via sintering, the process has to be very accurate to manufacture sections that may be combined to one color wheel without gaps between the sections. It is relatively difficult to manufacture ceramic sections with such an accuracy and is thus relatively expensive.

SUMMARY OF THE INVENTION

It is an object of the invention to provide an efficient manufacturing method for manufacturing color rings.

A first aspect of the invention provides a method of manufacturing a color ring as claimed in claim 1. A second aspect of the invention provides a ceramic ring as claimed in claim 12. A third aspect of the invention provides a light source as claimed in claim 14. A fourth aspect of the invention provides a projection device as claimed in claim 15. Advantageous embodiments are defined in the dependent claims.

A method manufacturing a color ring in accordance with the first aspect of the invention comprises a set of pressing a first ring body of a first granulated precursor. The first granulated precursor comprises a first luminescent material which converts the color of light emitted by a light emitter into a first one of at least one other color. In a subsequent step, the first ring body is sintered to obtain a first ceramic ring. The color ring comprises at least a segment of the first ceramic ring.

The first ceramic ring comprises the first luminescent material and as such the first ceramic ring may be used in a light source for converting the color of (a part of) the light which is emitted by the light emitter of the light source. Thus, a part of the first ceramic ring may be used in a color ring, or the whole first ceramic ring is the color ring.

It is efficient to manufacture a color ring in a ring shape, because the dimensions of the ring may be optimized for the diameter of the light beam which impinges on the color ring. Thus, compared to manufacturing a color wheel, which has the shape of a disk, less material is needed to manufacture the part of the color ring. This saves materials and thus costs. A further advantage of saving materials is that the first ceramic ring is manufactured in a more environmental friendly way.

A higher manufacturing efficiency is further obtained in the pressing step. The surface of the ring is relatively small and as such the forces which are applied in the pressing step may be relatively small because the applied pressure is the level of the applied force divided by the size of the area to which the force is applied. Thus, less powerful presses are required which saves costs and energy. The energy saving is a cost saving as well and leads to a more environmental friendly manufacturing method. Instead of using less powerful presses, a ceramic ring having a larger diameter may be manufactured.

The term "ceramic material" in the sense of the present invention means and/or includes especially a crystalline or polycrystalline compact material or composite material with a controlled amount of pores or which is pore free.

In another embodiment, the method further comprises the step of pressing a second ring body of a second granulated precursor. The first luminescent material is absent in the second granulated precursor. In a further step, the second ring body is sintered to obtain a second ceramic ring. Subsequently, the first ceramic ring is segmented in at least two parts and the second ceramic ring is segmented in at least two parts. In a last step of the method a part of the first ring is coupled to a part of the second ring. The color ring is for converting a color of light emitted by a light emitter into at least one other color. The first luminescent material converts the color of the light of the light emitter into a first one of the least one other color.

The manufacturing method is used to manufacture either the part of the color ring without a support structure, or the part of the color ring on the support structure. When the parts of the first ceramic ring and the second ceramic ring are coupled to each other, a self-supporting part of the color ring is obtained. However, in specific applications, for example, when the ceramic rings have a limited thickness, it may be advantageous to couple to parts of the first ceramic ring and of the second ceramic ring to a support structure which carries the part of the color ring. If the parts are coupled to the support structure, they have to be positioned such that the ends of the parts touch each other to form the part of color ring.

As discussed previously, the manufacturing method is efficient with respect to material use and the pressing step is performed more efficiently. Further, the segmenting may be performed cost efficiently, for example, by sawing the ring bodies. The known technologies to segment such bodies are relatively accurate and are, as a consequence, cost effective. Further, especially if the ring bodies are segmented in two or more parts of an equal angular size, the parts which are not used to form the color ring may be used to form another color ring. As such the amount of wasted material is kept low. It is to be noted that the ceramic rings are segmented along planes which comprise the central rotation axis of the ceramic rings. In other words, the central rotation axis of the ceramic rings has to be in the segmentation planes. After segmentation the parts of the ceramic rings are positioned with respect to each other such that a segmentation plane of the first part touches a segmentation plane of the second part.

From the beginning of the manufacturing process the parts of the final color ring are manufactured in the shape of the final product. Thus, compared to manufacturing a plate of a luminescent material and cutting out the required shapes, directly manufacturing the ring shape results in the prevention of an elaborate cutting step to obtain the specific ring shape.

It is to be noted that a ring shape is characterized by a diameter of the inner circle of the ring which is at least 50% of a diameter of the outer circumference. The color wheel of the cited art would not be addressed as being ring shaped although it has a small hole in the middle of the wheel. The diameter of the hole is only a small fraction of the diameter of the outer circumference of the color wheel.

It is further to be noted that a complete color ring may be manufactured by segmenting the first ceramic ring and segmenting the second ceramic ring such that the coupling of two parts results in a complete ring. In another embodiment, more than two parts are coupled to form the color ring. Or, in yet a further embodiment, a ring of another material is manufactured, for example, a ring of glass, which is segmented and an additional part of the ring of the another material is used to complete the color ring. In a further embodiment, segments from a third, or possibly a fourth, ceramic ring are inserted in the color ring.

In an embodiment, the forming of the part of the color ring comprises connecting the part of the first ceramic ring to the part of the second ceramic ring. A connection is advantageous when the parts of the ceramic rings are tick enough, and thus strong enough, to support its own weight. If the parts are connected they are directly coupled.

In an embodiment, the forming of the part of the color ring comprises coupling the part of the first ceramic ring to a support structure and coupling the part of the second ceramic ring to the support structure as well. The part of the color ring is obtained on the support structure. The use of a support structure is especially advantageous if the parts of the ceramic rings are not strong enough to support itself and/or to withstand forces which are received by the color ring in use. Examples of such forces are centrifugal forces. The support structure may further function as a heat sink to assist in the cooling of the (part of the) color ring. The support structure might be made out of metal, preferably of a metal with a relatively high stability and a relatively good thermal conductivity. Examples of such materials are aluminum and steel. Another example of an advantageous material for the support structure are ceramics.

In a further embodiment, the pressing step is performed by uniaxial pressing the granulated precursor into a template of a ring shape. In a practical embodiment, the pressing direction follows the central rotation axis of the ring.

In another embodiment, the method further comprises the step of thinning the first ceramic ring or the part of the first ceramic ring to a first predefined thickness and/or thinning the second ceramic ring or the part of the second ceramic ring to a second predefined thickness. To obtain the desired optical properties it is may be required to manufacture ceramic rings with a predefined thickness. The optical properties are, for example, how much light of the light which impinges on the color ring is converted into another color, or how much light is reflected, or how much light is transmitted through the color ring. Further, during the sintering step the ceramic rings obtain their final shape and their thickness may slightly differ. The thinning step may be used to obtain ceramic rings of a uniform thickness. The step of thinning the ceramic rings has to be performed after sintering the ring bodies to a ceramic ring. The step of thinning may be performed before segmenting the ceramic rings, or after segmenting the ceramic rings. If the step of thinning is performed after segmenting the ceramic rings, the parts of the ceramic rings are thinned. The first predefined thickness and the second predefined thickness are measured in a direction parallel to the central rotation axis of the ceramic rings.

It is to be noted that, if the first predefined thickness is different from the second predefined thickness, the color ring does probably not have a well-balanced mass distribution. In an embodiment additional material is added to the color ring at areas where the color ring has a relatively low amount of mass. In another embodiment the support structure has more mass at areas where a relatively thin part of the color ring is coupled to the support structure.

In an embodiment, the thinning is performed by grinding. In a practical embodiment the ceramic rings are grinded in a pre-grind step at two surfaces the ceramic ring. The two surfaces are the surfaces of the ceramic ring which may be seen when one looks from two different directions towards the ceramic ring, wherein the directions follow the central rotation axis of the ceramic ring. In a subsequent step one of the surfaces is further grinded to obtain the predefined thickness. When two steps of grinding are used the surface is relatively smooth and is at least smoother than the surface which was only pre-grinded.

In another embodiment, the method comprises a further step of modifying a surface of the first ceramic ring or of the part of the first ceramic ring, and/or modifying a surface of the second ceramic ring or of the part of the second ceramic ring. The surface which is modified may be a surface on which, in use, the light impinges or a surface where, in use, the light that is transmitted through the ceramic material is outcoupled. The modifying of the structure is performed after the sintering, and may be performed before segmenting the ceramic rings. The modifying may also be performed on the parts of the ceramic rings after the segmenting step. It is advantageous to include a separate step of modifying the surface, or surfaces, because it allows the creation of small structures with high accuracy. It is relatively difficult to create such structures by pressing the granulated precursor into a body and sintering the body. Modifying may comprise polishing and/or creating a structure.

In a further embodiment the method further comprises the step of polishing a surface of the first ceramic ring or the part of the first ceramic ring, and/or polishing a surface of the second ceramic ring or the part of the second ceramic ring. In specific applications it is advantageous to have a polished surface on which the light of the light emitter impinges or from where the transmitted light is emitted because it prevents, for example, uncontrolled scattering of light which impinges on the surface or which has to be outcoupled via the surface. Further, when light has to be reflected on the surface the polished surface better reflects the impinging light.

In another embodiment, the method further comprises the step of creating a structure in a surface of the first ceramic ring or of the part of the first ceramic ring, and/or creating the structure in a surface of the second ceramic ring or of the part of the second ceramic ring. With creating a structure is meant the creation of recesses, scratches, or, for example, protrusions like prisms. In specific applications it is advantageous to have such a structured surface because the outcoupling of light from the ceramic material may be better, or specific reflection, refraction, or scattering characteristics may be obtained.

In a further embodiment, the method comprises a further step of applying a coating to a surface of the first ceramic ring or of the part of the first ceramic ring, and/or applying a coating to a surface of the second ceramic ring or of the part of the second ceramic ring. The surface to which the coating, or coatings, may be applied are surfaces of the ceramic rings or parts of the ceramic rings on which, in use, impinges the light or from where, in use, the light is outcoupled if the light is transmitted through the ceramic material. The coatings are used to influence the optical characteristics of the color ring and as such to influence characteristics of light that is emitted by the light source which comprises the color ring. The application of the coating has to be performed after the step of sintering the ring bodies, and may be performed before or after segmenting the ceramic rings, and may even be performed after coupling the parts to obtain (the part of) the color ring.

The coatings may be applied with state of the art coating application technologies, like spray-coating, sputtering or evaporation deposition.

In an embodiment, the coating is at least one of the group of: light filtering coating, light absorption coating, anti-reflection coating, a light outcoupling coating and a luminescent coating. The light filtering coating may be used to influence the color distribution of the light which is reflected by, or emitted through the ceramic material. Especially when the used luminescent material does not exactly generate the desired color distribution, the light filtering coating may assist to improve the color distribution towards the desired color distribution. The light absorption coating may be used to influence the intensity of the light which is reflected by, or emitted through the ceramic material. An anti-reflection coating may be used to prevent undesired reflections and, if light has to be transmitted through the ceramic material, to assist the incoupling of light which impinges on the ceramic material. The light outcoupling coating may be used to assist the outcoupling of light from the ceramic material into the ambient of the color ring. The luminescent coating has a luminescent material. The luminescent material converts a first color into a second color. If the luminescent coating is used on the ceramic rings and/or segments, and especially if used on the segment which already comprises a luminescent material, the light which is transmitted through, or reflected by the segment, comprises the combination of two emission spectra of luminescent materials. This allows the creation of more advanced light emission spectra and a better control of a color point of the emitted light.

In a further embodiment, the second granulated precursor comprises a second luminescent material which differs from the first luminescent material. The second luminescent material converts the color of the light emitter of the light source into light of a further another color. According to this embodiment (a part of) a color ring is manufactured which has two different parts and each one of the parts has a different luminescent material. Thus, when the color ring is used in a light source, the color of the light emitter may be converted to a second one of the at least one other color. Thus, the light source is capable of emitting light with three different color distributions: a first color distribution emitted by the light emitter, a second color distribution which comprises the first one of the at least one other color, and a third color distribution which comprises the second one of the at least one other color.

In another embodiment, the method further comprises the steps of: i) pressing a third ring body of a third granulated precursor not comprising the first luminescent material and/or not comprising the second luminescent material, ii) sintering the third ring body to obtain a third ceramic ring, iii) segmenting the third ceramic ring into at least two parts. The step of coupling a part of the first ceramic ring to a part of the second ceramic ring further comprises coupling a part of the third ceramic ring to the part of the first ceramic ring and/or to the part of the second ceramic ring to obtain (the part of) the color ring comprising the three parts. The step of coupling the part of the first ceramic ring to a support structure and coupling the part of the second ceramic ring to the support structure further comprises coupling the part of the third ceramic ring to the support structure to obtain the color ring comprising the three parts. The embodiment provides a manufacturing method to obtain a color ring which comprises three parts and each one of the three parts has other characteristics and as such the light source which comprises the color ring may emit several color distributions in a time multiplexed way. This is especially advantageous when the color ring is used in projectors wherein the primary colors red, green and blue have to be available in a time multiplexed way to project a color image.

The embodiment relates in particular to the manufacturing of a third ceramic ring of which a part is used to form the part of the ceramic ring. It is to be noted that the method of manufacturing a color ring is not limited to the manufacturing of a maximum of three ceramic rings of which parts are used to form the part of the color ring. A plurality of ceramic rings may be manufactured which each have different characteristics, for example, each one comprises different luminescent materials, and a part of each one of the plurality of ceramic rings is used to form a part of the color ring or to form the complete color ring.

In a further embodiment, the third granulated precursor comprises a third luminescent material being different from the first luminescent material and being different from the second luminescent material.

In another embodiment, the second ceramic ring is light transmitting or light reflective. The meaning of light transmitting is that at least a part of the light which impinges on the second ceramic ring is transmitted through the second ceramic ring. Thus, the second ceramic ring may be transparent or translucent. Further, if the second ceramic ring comprises luminescent material, the effect of light transmitting is that the light which is the result of the conversion of light by the luminescent materials is also transmitted through the second ceramic ring. The meaning of light reflective is that at least a part of the light which impinges on the second ceramic ring is reflected. The reflection may be according to the law of "angle of incidence equals the angle of reflection" and the reflection may be uncontrolled reflection, which means that the impinging light is scattered. Further, if the second ceramic ring comprises luminescent material, the effect of light reflective is that light which impinges on the luminescent material may party be converted to light of another color and the light of another color is emitted into the ambient of the second ceramic ring. It is to be noted that the first ceramic ring may also be partly light transmitting and/or partly light reflective, however, the first ceramic ring also converts a part of the impinging light into light of another color. It is to be noted that a specific choice has been made with respect to the second granulated precursor to obtain the light transmitting property of the part of the second ceramic ring. The parameters of pressing step and of sintering step of the manufacturing method have to be adapted to the characteristics of the second granulated precursor and have to be adapted to the required characteristics of the ceramic ring.

In an embodiment, the second granulated precursor does not comprise any luminescent material. Thus, the second part of the color ring only transmits or reflects the light of the light emitter without changing the color of the light, and the first part of the color ring changes the color of the light which impinges on the first part. If, for example, blue light impinges on the color ring while the color ring rotates, blue light is transmitted through or reflected by the color ring when the light impinges on the second part, and, for example, yellow light is emitted by the first part when the blue light impinges on the first part, and as such blue and yellow light are emitted by the light source in a time multiplexed way. If the rotation speed is high enough, the human eye and brain may experience the emitted combination of the blue and yellow light, for example, as white light.

Especially, if the light emitter is a laser light emitting diode, it is advantageous to use the second part of the color ring to transmit or reflect the light of the light emitter without altering the color of the light. A property of laser light is the spatial and temporal coherence of the light, and as such there is a risk of disturbing Speckle-effects and other interference effects. When the light is transmitted through or reflected by the second part, the coherence properties are reduced. Further, because the light is successively transmitted through, or reflected by materials which are similar, the characteristics of the transmitted or reflected light has about the same properties. Only the color of the light which is transmitted through, or reflected by the different materials differs.

In an embodiment, the shape of the support structure is a selected one of the group of: a disk shape, a shape of a wheel with spokes and a ring shape. Depending on the specific application specific embodiments of the support structure have advantages. Especially, if the light which impinges on the color ring has to be transmitted through the color ring, the support structure may not obstruct the light. Because the parts of the ceramic ring are coupled to the support structure, the combination of support structure and parts may be used in any orientation in a light emitting device. The support structure may be positioned above, below or aside the color ring. In a specific embodiment, the support structure is a disk shape which is arranged within the color ring, and in another specific embodiment, the support structure has a ring shape which is arranged inside the color ring, and in yet another specific embodiment the support structure has a ring shape which is arranged around the color ring.

In another embodiment, the first luminescent material converts light of a first color distribution into a second color distribution being different from the first color distribution. The first color distribution comprises blue light and the blue light is absent in the second color distribution. In many practical applications a blue Light Emitting Diode or a blue emitting laser are used as a light emitter because these light emitters are relatively efficient and thus cost efficiently.

In a further embodiment, the first luminescent material and/or the second luminescent material is a material of the group of: $BaMgAl_{10}O_{17}$:Eu (BAM), $Lu_3Al_5O_{12}$:Ce (LuAG), $Y_3Al_5O_{12}$:Ce (YAG), $SrSi_2O_2N_2$:Eu (SSONE), $Ba_3Si_6O_{12}N_2$:Eu (BSONE), $(Ba,Sr)_2Si_5N_8$:Eu (BSSNE), $CaSiAlN_3$:Eu (ECAS). The luminescent materials in the specified group are suitable for use in a ceramic luminescent material and convert blue or violet light into a primary color. In further embodiments, garnet materials with (co-) dopants of the list of Gd and Ga or luminescent organic materials may be used as well.

In another embodiment, the first granulated precursor, the second granulated precursor and/or the third granulated precursor comprise a sintering aid and/or a minority binder. The sintering aid improves the efficiency of the sintering process and/or improves the quality of the created ceramic ring. The minority binder is especially useful in the pressing step to prevent that the ring body falls into pieces after the pressing of the ring body. The minority binder is often burned out in a later step of the manufacturing method, for example, in the sintering step.

A second aspect of the invention defines a ceramic ring for converting a color of light emitted by a light emitter into at least one other color, the ceramic ring comprising a first luminescent material for converting the color of the light emitter into a first one of the at least one other color.

In an embodiment, a part of a color ring is provided for converting a color of light emitted by a light emitter into at least one other color. The part of the color ring comprises a first part of a first ring of a first ceramic material comprising a first luminescent material. The first luminescent material converts the color of the light of the light emitter into a first one of the at least one other color. The color ring further comprises a part of a second ring of a second ceramic material. The first luminescent material is absent in the second ceramic ring. The first part and the second part are coupled to form the part of the color ring.

As discussed at the first aspect of the invention, the part of the color ring may be manufactured efficiently. The use of a ceramic material is advantageous because the material conducts heat well and easily spreads the heat to the environment of the part of the color ring. Further, the ceramic material is less susceptible for overheating and as such the part of the color ring may become warmer than the known color wheels that have phosphors in a dye.

The part of the color ring further provides the same benefits as the manufacturing method according to the first aspect of the invention and has similar embodiments with similar effects as the corresponding embodiments of the manufacturing method.

According to a third aspect of the invention a light source is provided which comprises the part of the color ring according to the second aspect of the invention.

According to a fourth aspect of the invention, a projection device is provided which comprises the light source according to the third aspect of the invention.

The light source and the projection device according to the third and fourth aspect of the invention provide the same benefits as the manufacturing method according to the first aspect of the invention and have similar embodiments with similar effects as the corresponding embodiments of the manufacturing method.

According to another aspect of the invention, a color ring is provided which is manufactured according to the manufacturing method according to the first aspect of the invention.

In the context of the document, light of a specific color typically comprises light having a spectrum. The specific spectrum may, for example, comprise a primary color having a predefined bandwidth around a predefined wavelength, or may, for example, comprise a plurality of primary colors. The predefined wavelength is a mean wavelength of a radiant power spectral distribution. In this context, light of a specific color also includes non-visible light, such as ultraviolet light. The light of a primary color, for example, includes Red, Green, Blue, Yellow and Amber light. Light of a specific color may also comprise mixtures of primary colors, such as Blue and Amber, or Blue, Yellow and Red.

These and other aspects of the invention are apparent from and will be elucidated with reference to the embodiments described hereinafter.

It will be appreciated by those skilled in the art that two or more of the above-mentioned embodiments, implementations, and/or aspects of the invention may be combined in any way deemed useful.

Modifications and variations of the system, the method, and/or of the computer program product, which correspond to the described modifications and variations of the system, can be carried out by a person skilled in the art on the basis of the present description.

Figure 1:
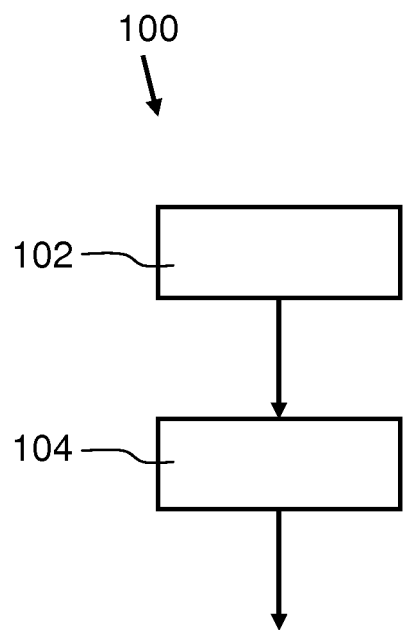
FIG. 1 schematically shows an embodiment of a method according to the first aspect of the invention, FIG. 2 schematically shows another embodiment of the method according to the first aspect of the invention, FIG. 3 schematically shows the manufacturing of a part of the color ring, FIG. 4a schematically shows an embodiment of a color ring in use, FIG. 4b schematically shows another embodiment of the color ring in use, FIG. 5a schematically shows a top-view of a first embodiment of an assembly of a part of a color ring and a support structure, FIG. 5b schematically shows a top-view of a second embodiment of an assembly of a part of a color ring and a support structure, FIG. 5c schematically shows a top-view of a third embodiment of an assembly of a color ring and a support structure, FIG. 6a schematically shows a top-view of a fourth embodiment of an assembly of a color ring and a support structure, FIG. 6b schematically shows a top-view of a fifth embodiment of an assembly of a color ring and a support structure, FIG. 6c schematically shows a top-view of a sixth embodiment of an assembly of a color ring and a support structure, FIG. 7a schematically shows an embodiment of a light source according to the third aspect of the invention, and FIG. 7b schematically shows an embodiment of projection device according to the fourth aspect of the invention.

It should be noted that items denoted by the same reference numerals in different Figures have the same structural features and the same functions, or are the same signals. Where the function and/or structure of such an item have been explained, there is no necessity for repeated explanation thereof in the detailed description.

The figures are purely diagrammatic and not drawn to scale. Particularly for clarity, some dimensions are exaggerated strongly

DETAILED DESCRIPTION

A first embodiment of a method 100 to manufacture a color ring is shown in FIG. 1. The color ring is for use in a light source which comprises a light emitter. The color ring converts a color of the light emitted by the light emitter into at least one other color. In step 102 of the method 100 a first granulated precursor comprising a first luminescent material is pressed into a first ring body. The first luminescent material converts the color of the light emitted by the light emitter into a first one of the at least one other color. In an embodiment the first granulated precursor is dispensed into a template comprising a recess which has the form of a ring, and with uniaxial pressing the first granulated precursor is pressed into the first ring body. In step 104 the first ring body is sintered to obtain the first ceramic ring. The first ceramic ring may be of a light transmitting material such that light which impinges on the first ceramic ring is partly transmitted through the ceramic ring and a part of the light, which is transmitted through the ceramic ring, is converted into light of another color. A specific first granulated precursor has to be selected to obtain such a light transmitting ceramic ring. In another embodiment, the first ceramic ring has a light reflective surface. Light which impinges on the light reflective surface is partly reflected in its original color and a part of the light is converted into light of another color and is emitted back by the surface. In specific embodiments, the concentration of the first luminescent material may be high enough to convert all the light emitted by the light emitter into light of another color, and as such, if the ceramic ring is light transmitting only light of the another color is emitted by the ceramic ring, and if the ceramic ring is light reflective, no light of the original color of the light emitter is reflected. It is to be noted that the first ceramic ring as a whole may be used as the color ring and that in another embodiment a part of the first ceramic ring may be used to form at least a part of the first ceramic ring.

It is to be noted that a minority binder may be added to the first granulated precursor to obtain a more stable shape of first ring body after pressing the first granulated precursor. The minority binder may prevent that the first ring body falls into pieces. In general the minority binder is burned out of the first ring body in the sintering step 104. The first granulated precursor may also comprise a sintering aid which improves the result of the sintering step 104. The sintering aid may further improve the efficiency of the sintering step 104.

Figure 2:
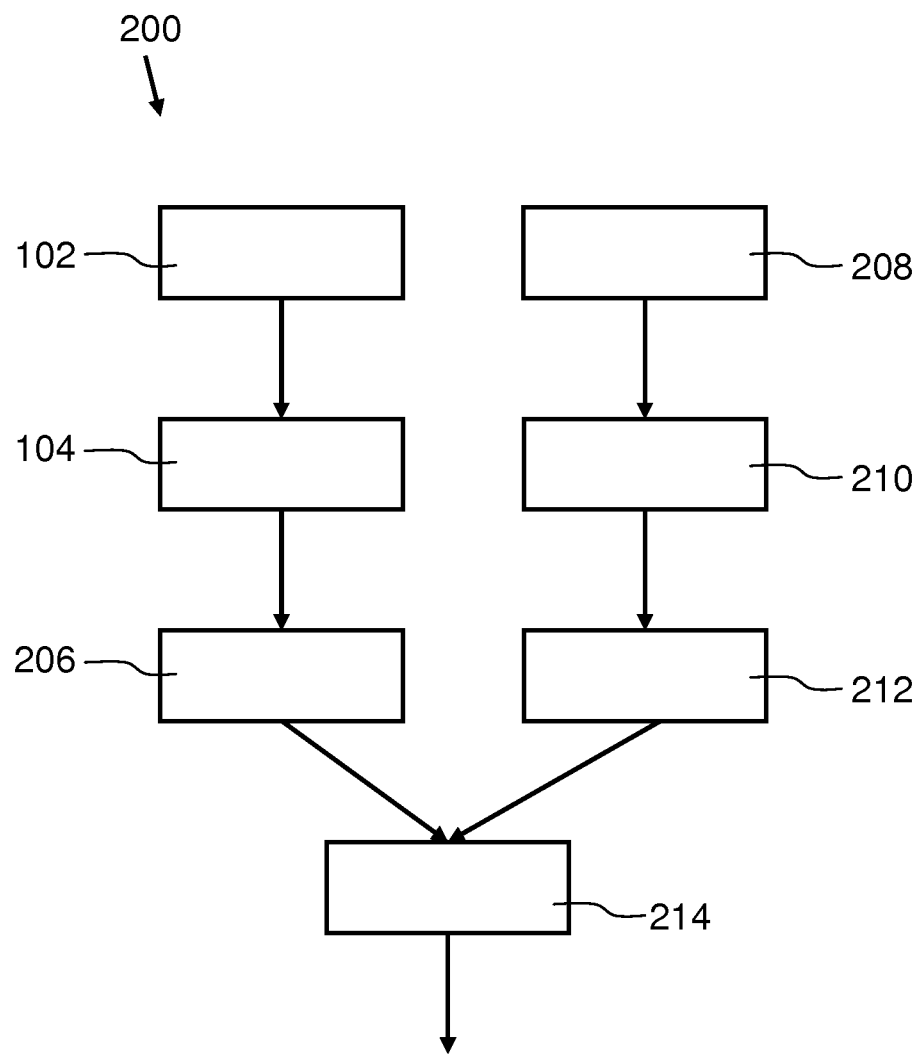

In FIG. 2 an embodiment of another method 200 to manufacture a part of a color ring is presented. The method comprises the steps of pressing 102 the first ring body of the first granulated precursor and sintering 104 the first ring body to obtain the first ceramic ring. In step 206 the first ceramic ring is segmented in at least two parts. In step 208 a second ring body is pressed from a second granulated precursor. The first luminescent material is not present in the second granulated precursor. In step 210 the second ring body is sintered to obtain a second ceramic ring. In step 212 the second ceramic ring is segmented in at least two parts. In step 214 at least one part of the first ceramic ring is coupled to at least one part of the second ceramic ring to form at least a part of the color ring.

The pressing step 208 and sintering step 210 are similar to the pressing step 102 and sintering step 104, however, in the pressing step 208 another granulated precursor is used to obtain a ceramic ring wherein the first luminescent material is absent. It is to be noted that the second granulated precursor may comprise a second luminescent material which converts the light emitted by the light emitter into light of a second one of the at least one other color.

The segmenting steps 206 and 212 may be performed via sawing the ceramic rings into parts. The plane along which the ceramic rings are segmented may be a plane that comprises the central rotation axis of the ceramic rings, as such segments are obtained which may easily be coupled to each other without creating gaps between the segments. The segmentation plane is, in other words, a plane that is defined by the central rotation axis and one of the lines perpendicular to the central rotation axis. It is to be noted that other technologies to segment ceramic parts may be used as well.

The forming 214 of the part of the ceramic ring may be performed by directly coupling the part of the first ceramic ring to the part of the second ceramic ring, for example by gluing or soldering the parts together. In another embodiment, the coupling is performed indirectly via a support structure. The part of the first ceramic ring is coupled to the support structure, for example, by gluing or soldering the part to the support structure, and the part of the second ceramic ring is coupled to the support structure with similar techniques. It is to be noted that the parts have to be coupled to the support structure such that a segmentation surface of the part of the first ceramic ring faces a segmentation surface of the part of the second ceramic ring.

Figure 3:
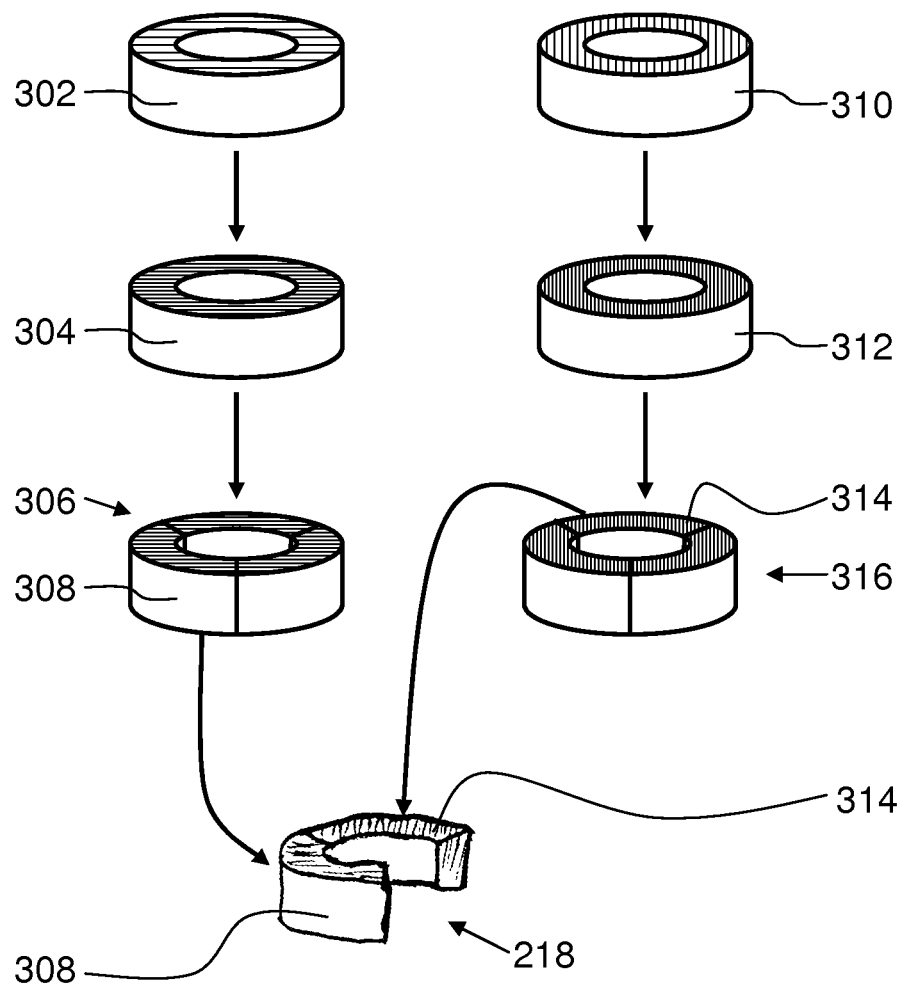

In FIG. 3 schematically illustrates the manufacturing of the part of the color ring 218. A first ring body 302 is shown. The first ring body 302 is the result of pressing the first granulated precursor in a ring shape. Sintering is used to transform the first ring body 302 into a first ceramic ring 304. The first ceramic ring 304 and the first ring body 302 have substantially the same shape, however, during sintering the dimensions may slightly change. A second ring body 310 is shown. The second ring body 302 is the result of pressing a second granulated precursor in a ring shape. The second ceramic ring 312 is the result of sintering the second ring body 310. A part 308 of a segmented first ceramic ring 306 is used to form the part of the color ring 218. A part 314 of a segmented second ceramic ring 316 is used to form the part of the color ring 218.

In FIG. 4a the use of an embodiment of a color ring 400 is shown. The color ring 400 comprises sections 410, 412, 424 of a ceramic material. Each section has different optical characteristics. At least one section 410, 412, 424 comprises a first luminescent material. Other sections 410, 412, 424 may also comprise a luminescent material and in a practical embodiment the luminescent materials of the different sections 410, 412, 424 may differ from each other. Each section 410, 412, 424 is light transmitting, which means that at least a part of the light which impinges at a surface 420 of the section 410, 412, 424 exits the section 410, 412, 424 at another surface 428 that is opposite the surface 420 on which the light impinges. In an embodiment one of the sections 410, 412, 424 does not comprise a luminescent material. In another embodiment one of the sections 410, 412, 424 is not of ceramic material and may, for example, be a segment of a ring made of glass.

In use, a light emitter 418 emits light of a single color 422. The emitted light impinges on the surface 420 of the color ring 400. If it is assumed that section 424 comprises a luminescent material and if the light beam of the light emitter 418 is directed towards the section 424, a part of the light of the single color 422 is transmitted through the section 424 and a part of the light is converted by the luminescent material into light of another color 430. The transmitted light leaves the ceramic material of the sections 410, 412, 424 at the surface 428 which is opposite the surface 420.

The color ring 400 has an imaginary central rotation axis 416. The inner radius of the ring is indicated in the figure with reference number 404 and has the value $d_1$. The inner radius 404 is the distance from the central rotation axis 416 towards the surface 406 of the color ring 400 which faces towards the central rotation axis 416. The outer radius 402 is the distance from the central rotation axis 416 to the outer circumference 408 of the color ring 400 and has a value $d_2$. It is to be noted that a ring shape is characterized by the fact that the value $d_1$ is larger than half the value of $d_2$, thus, $d_1 > 0.5\ d_2$.

In use, the color ring 400 rotates around the central rotation axis 416 of the color ring 400 as indicated with arrow 414. Thus, the light beam emitted by the light emitter 418 successively impinges on the sections 410, 412, 424. Because the optical characteristics of each section 410, 412, 424 are differently, especially because of the use of different luminescent material, the light beams which are successively emitted by the color ring 400 have different colors. In practical applications the color ring 400 rotates at a relatively high speed and as such a human experiences the color of the light which is emitted by the color ring 400 as the combination of the colors which are successively and repeatedly emitted.

It is to be noted that the method to manufacture the color ring 400 may comprise the step of thinning the first ceramic ring, the second ceramic ring, a third ceramic ring, and/or thinning a part of the first ceramic ring, a part of the second ceramic ring, a part of the third ceramic ring. The thinning is performed to obtain sections 410, 412, 424 of a predefined thickness 426. The predefined thickness 426 is chosen such that desired optical properties are obtained by the color ring 400. For example, a relatively thick color ring 400 converts more light 422 of the light emitter 418 towards light of another color 430.

It is to be noted that the sections 410, 412, 424 may each have a different predefined thickness. This may result in an unbalanced mass distribution. When, in use, the color ring 400 rotates the unbalanced mass distribution may cause vibrations. To prevent such vibrations, the mass density of the sections 410, 412, 424 may be chosen such that the color ring 400 does not have an unbalanced mass distribution. Other solutions may be to locally attach additional mass to the color ring 400 to compensate for the unbalanced mass distribution, or couple the color ring 400 to a support structure which has also an unbalanced mass distribution. In this case, the unbalanced distribution of the support structure should be the inverse of the unbalanced distribution of the color ring 400.

The method of manufacturing the color ring 400 may comprise an additional steps to modify the structure of the surface 420 of the color ring 400 on which the light of the light emitter impinges, or modifying the structure of the surface 428 of the color ring 400 from where the light exits the ceramic material. The modifying of the surfaces 420, 428 may be the polishing of the surfaces 420, 428 to prevent, for example, the scattering of light, or may be the creation of a regular or non-regular structures to assist, for example, the outcoupling of light from the ceramic material. The creation of the structures at the surfaces 420, 428 may comprise the creation of recesses, protrusions, or, for example, scratches. It is to be noted that the step of modifying one of the surfaces 420, 428 may be performed on the ceramic rings which are not yet segmented, on individual sections 410, 412, 424 of the ceramic rings, on the formed part of the color ring, or on the color ring 400 as a whole.

The method of manufacturing the color ring 400 may comprise an additional step of applying a coating to one of the surfaces of the color ring 400. The coating may be applied to the surface 420 on which the light of the light emitter impinges, and/or to the surface 428 from where the light is outcoupled by the color ring 400. The coating is at least one of the group of: light filtering coating, light absorption coating, anti-reflection coating, a light outcoupling coating and a luminescent coating. The light filtering coating may be used to influence the color distribution of the light which is reflected by, or emitted through the ceramic material. Especially if the used luminescent material does not exactly generate a desired color distribution, the light filtering coating may assist to improve the color distribution towards the desired color distribution. The light absorption coating may be used to influence the intensity of the light which is reflected by, or emitted through the ceramic material. An anti-reflection coating may be used to prevent undesired reflections and, if light has to be transmitted through the ceramic material, to assist the incoupling of light which impinges on the ceramic material. The light outcoupling coating may be used to assist the outcoupling of light from the ceramic material into the ambient of the color ring. The luminescent coating has a luminescent material. The luminescent material converts a first color into a second color. If the luminescent coating is used on the ceramic rings and/or single sections 410, 412, 424, and especially when used on the section 410, 412, 424 which already comprises a luminescent material, the light which is transmitted through, or reflected by the section 410, 412, 424 comprises the combination of two emission spectra of the luminescent materials. This allows the creation of more advanced light emission spectra and a better control of a color point of the emitted light. It is to be noted that the step of application of the coating(s) may be performed on the ceramic rings which are not yet segmented, on individual sections 410, 412, 424 of the ceramic rings, on the formed part of the color ring, or on the color ring 400 as a whole.

In an embodiment, the light emitter 418 is a laser light source which emits blue light. One of the sections 410, 412, 424 may comprise luminescent material which converts the blue light into light of the primary color red. Another one of the sections 410, 412, 424 may comprises luminescent material which converts the blue light into light of the primary color green. The last one of the sections 410, 412, 424 does not comprise luminescent material and is light transmitting. It is advantageous to transmit the blue laser light through a ceramic material because some of the typical characteristics of laser light are changed by the material. Laser light is strongly coherent in space and time and as such there is a risk of Speckle-effects and other interference effects. The transmission through the ceramic material results in less coherent light.

TABLE 1

Examples for suitable ceramic conversion materials

| laser wavelength $\lambda_{exc}$/nm | material | composition | Conversion to primary color |
| --- | --- | --- | --- |
| 405 | BAM | $BaMgAl_{10}O_{17}$:Eu | blue |
| 450 | LuAG | $Lu_3Al_5O_{12}$:Ce | green |
| 450 | YAG | $Y_3Al_5O_{12}$:Ce | yellow |
| 405/450 | SSONE | $SrSi_2O_2N_2$:Eu | green |
| 405/450 | BSONE | $Ba_3Si_6O_{12}N_2$:Eu | green |

TABLE 1-continued

Examples for suitable ceramic conversion materials

| laser wavelength $\lambda_{exc}$/nm | material | composition | Conversion to primary color |
| --- | --- | --- | --- |
| 405/450 | BSSNE | $(Ba,Sr)_2Si_5N_8$:Eu | orange |
| 405/450 | ECAS | $CaSiAlN_3$:Eu | red |

In the above presented Table 1 examples of suitable luminescent materials are presented. The presented materials are capable of converting blue (laser) light of a wavelength of 405 and/or 450 nm, towards other primary colors.

FIG. 4b shows another use-case of a color ring 450. The color ring 450 comprises three sections 452, 456, 458, which are light reflective and not light transmitting. At least one section, in FIG. 4b section 458, comprises a first luminescent material which converts a color of the light 422 emitted by a light source 418 into a first color 430 of at least one another color. In a practical embodiment, the other sections 452, 456 also comprise a luminescent material, however, the luminescent materials in each one of the sections 452, 456, 458 differ from each other. As discussed in the context of FIG. 4a, the color ring 450 also rotates around its central rotation axis 416. Light from the light emitter 418 impinges on the top surface 454 of the color ring 450. The light beam of the light emitter hits the surface 454 in a certain angle being different from the perpendicular angle of 90 degrees. The light beam is reflected and a part of the light 422 of the light emitter 418 is converted into light of another color 430.

Figure 5A:
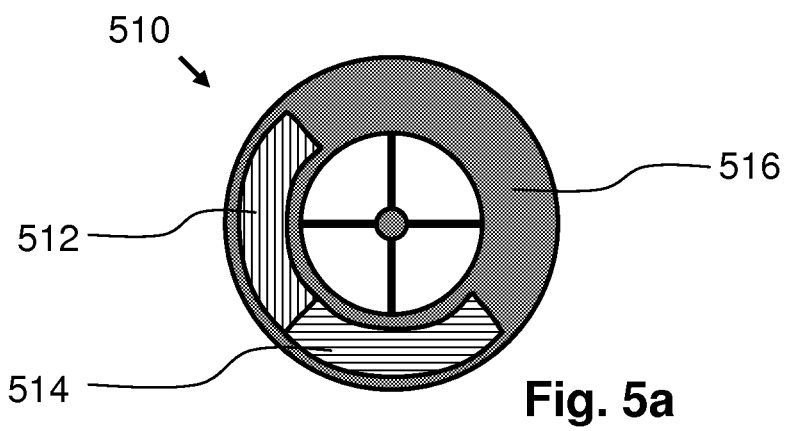
Figure 5B:
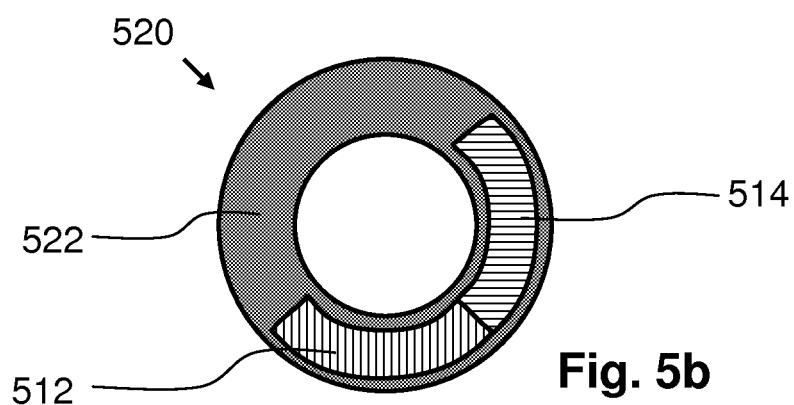
Figure 5C:
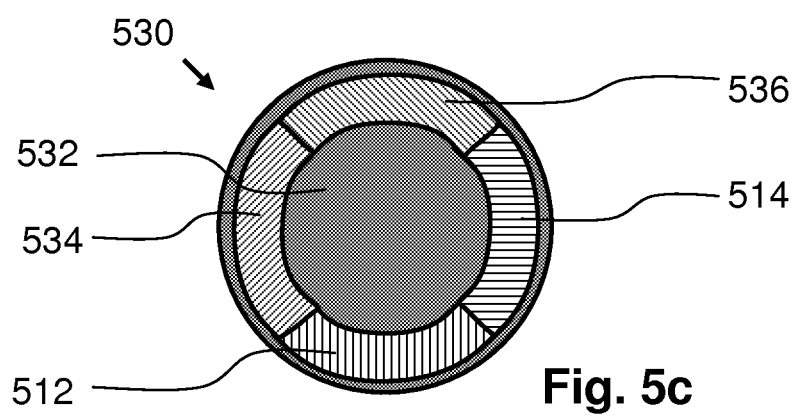

In FIG. 5a to FIG. 5c, top-views of several embodiments of assemblies of a support structure and (a part of) a color ring are presented. The top-view are the view which is seen when one looks via the central rotation axis of (the part of) the color ring towards the assembly. As discussed in the context of FIG. 2 the parts of the first ceramic ring and of the second ceramic ring may be directly coupled to each other, or they may be coupled to a support structure. The support structure provides support to (the part of) the color ring, which is especially advantageous if (the part of) the color ring is relatively thin and as such not strong enough to withstand relatively large forces. Especially when the color ring is rotated relatively fast, the centrifugal forces may become relatively large. Further, the color ring may become relatively hot in use because of the absorption of light and the absorption of energy when light is converted from a color into another color. The support structure may further be a heat sink which conducts the heat of the color ring away to the environment of the presented assemblies 510, 520, 530.

In FIG. 5a a first assembly 510 is presented which comprises a support structure 516 which has the shape of a wheel with spokes. In FIG. 5a two parts 512, 514 of two different ceramic rings are coupled to the support structure 516. In FIG. 5b the support structure 522 has the shape of a ring. In FIG. 5c the support structure 532 has a disk shape. In FIG. 5c a complete color ring is shown which comprises four parts 512, 514, 534, 536 of four different ceramic rings. In all embodiments of FIGS. 5a, 5b and 5c the ceramic parts are assembled onto and connected to the support structure.

The support structures 516, 522, 532 might be made out of metal, preferably of a metal with a relatively high stability and a relatively good thermal conductivity. Examples of such materials are aluminum and steel. Another example of an advantageous material for the support structure 516, 522, 532 is the use of a ceramic support structure.

As discussed earlier in the context of FIG. 4a, the mass of (the part of) the color ring may be unbalanced with respect to the central rotation axis of (the part of) the color ring, which is unfavorable when (the part of) the color ring is rotated. The presented support structures 516, 522, 532 may be used to compensate for the unbalanced mass such that the assembly as a whole has a balanced mass distribution.

Figure 6A:
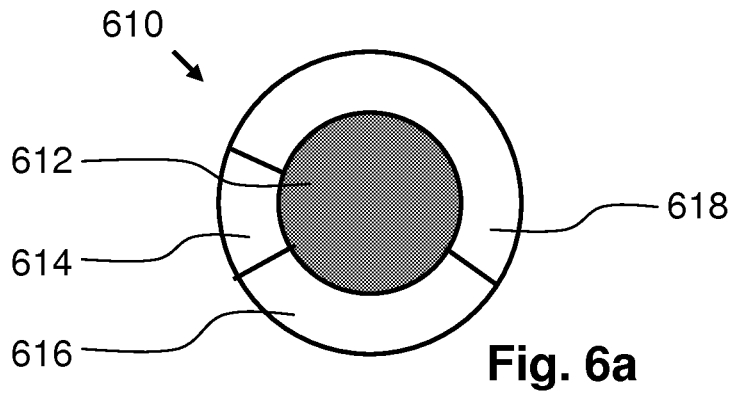
Figure 6B:
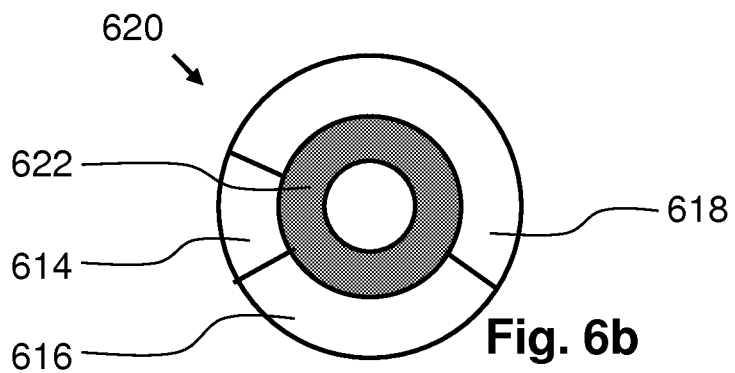
Figure 6C:
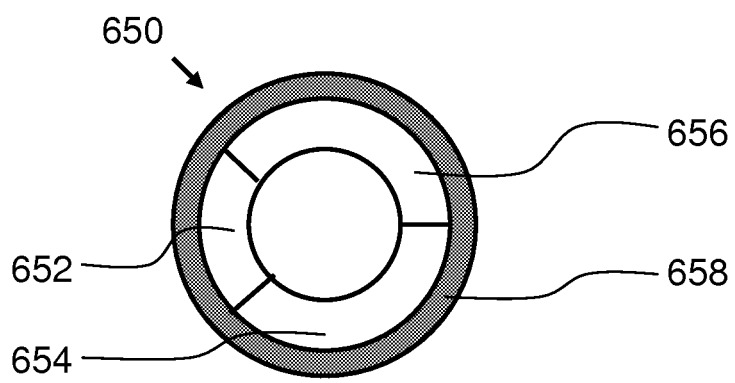

In FIGS. 6a to 6c three other top-views of embodiments of assemblies of a color ring and a support structure are presented. The assembly 610 of FIG. 6a comprises a color ring which consists of three sections 614, 616, 618 and a support structure 612 which has a disk shape. Thus, in other words, the disk is enclosed by the color ring. FIG. 6b shows an assembly 620 which is similar to the assembly 610 of FIG. 6a. However, the assembly 620 has a ring shaped support structure 620 which is enclosed by the color ring. The assembly 650 of FIG. 6c comprises a color ring of three parts 652, 654, 656 and comprises a support structure 658 which has a ring shape. In the assembly 650 the ring shaped support structure 658 encloses the color ring.

It is to be noted that the disk shaped support structure 532 of FIG. 5c and the disk shaped support structure 612 of FIG. 6a may have a hole in their center which is used to arrange the assembly in a light emitting apparatus.

Figure 7A:
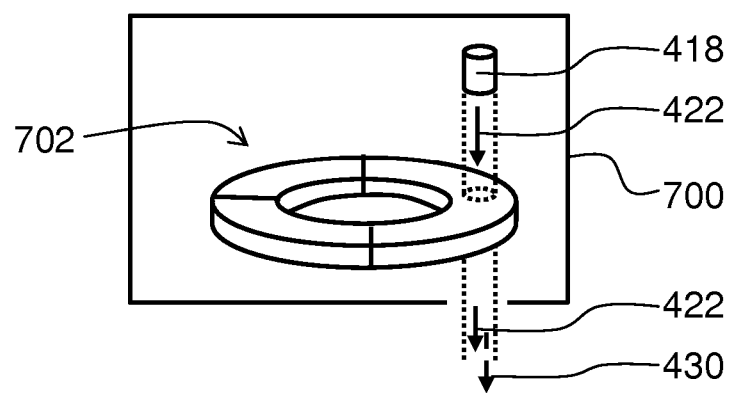

In FIG. 7a an embodiment of a light source 700 according to a third aspect of the invention is schematically presented. The light source 700 comprises a light emitter 418 which emits light of a first primary color 422. The light source 700 further comprises a color ring 702 which is the combination of three ceramic parts of which at least two parts comprises luminescent materials. The combination of the color ring 702 and the light emitter 418 operates similar to the embodiment of FIG. 4a. Thus, if the light 422 emitted by the light source 422 is transmitted through a part of the color ring 702, at least some of the light 422 is converted into light of another color 430, and thus, as long as the specific section of the color ring 702 is in the light beam of the light emitter 418, a combination of different colors 422, 430 is emitted into the ambient. It is to be noted that in another embodiment all the light of the light emitter 418 is converted into another color 430. Because the color ring 702 rotates, in successive periods of time other colors of light are emitted by the light source 700. If the rotation speed is high enough, humans are not capable to perceive the separate colors and they perceive the light which is emitted by the light source 700 as a combination of different colors.

Figure 7B:
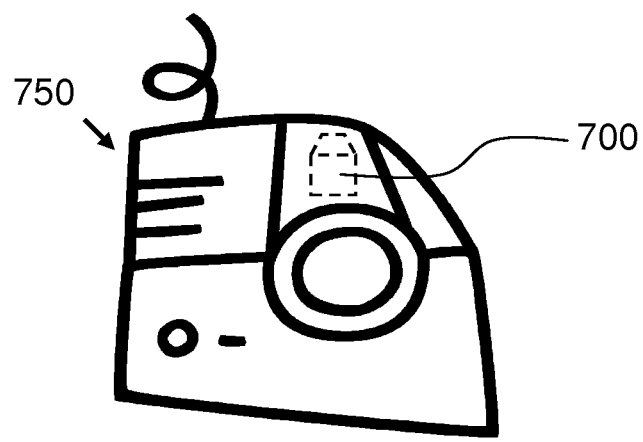

FIG. 7b presents an embodiment of a projection device 750, for example, a beamer, which comprises the light source 700 of FIG. 7a.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of manufacturing a color toroid converting a color of light emitted by a light emitter into at least one other color, the method comprising the steps of:
    pressing a first toroidal body, having an inner diameter and an outer diameter, of a first granulated precursor comprising a first luminescent material for converting the color of the light of the light emitter into a first one of the at least one other color; and
    sintering the first toroidal body to obtain a first ceramic toroid,
    wherein the color toroid comprises at least a segment of the first ceramic toroid and the toroids have a toroidal shape of which a diameter of the inner diameter of each toroid is at least 50% of the diameter of the outer diameter.

2. The method according to claim 1, the method further comprising the steps of:
    pressing a second toroidal body of a second granulated precursor, wherein the first luminescent material is absent;
    sintering the second toroidal body to obtain a second ceramic toroid;
    segmenting the first ceramic toroid in at least two parts and segmenting the second ceramic toroid in at least two parts; and
    forming at least a part of the color toroid by coupling a part of the first ceramic toroid and a part of the second ceramic toroid.

3. The method according to claim 2, wherein the forming of the part of the color toroid comprises connecting the part of the first ceramic toroid to the part of the second ceramic toroid.

4. The method according to claim 2, wherein the forming of the part of the color toroid comprises coupling the part of the first ceramic toroid to a support structure and coupling the part of the second ceramic toroid to the support structure for obtaining the part of the color toroid on the support structure.

5. The method according to claim 4, wherein a shape of the support structure is selected from the group consisting of a disk shape, a shape of a wheel with spokes and a toroidal shape.

6. The method according to claim 2, further comprising a step of thinning a portion of the first ceramic toroid to a first predefined thickness and thinning a portion of the second ceramic toroid to a second predefined thickness.

7. The method according to claim 2, further comprising the steps of:
    polishing a portion of a surface of the first ceramic toroid, and polishing a portion of a surface of the second ceramic toroid;
    creating a first structure in a portion of the surface of the first ceramic toroid; and
    creating second structure in a portion of the surface of the second ceramic toroid.

8. The method according to claim 2, wherein the second granulated precursor comprises a second luminescent material being different from the first luminescent material, wherein the second luminescent material converts the color of the light emitted by the light emitter into light of a second one of the at least one other color.

9. The method according to claim 2, wherein the second ceramic toroid is light transmitting.

10. The method according to claim 1, wherein the first luminescent material converts light of a first color distribution into a second color distribution being different from the first color distribution, wherein the first color distribution comprises blue light and blue light is absent in the second color distribution.

11. A method according to claim 8, wherein, the first luminescent material and the second luminescent material are selected from the group consisting of $BaMgAl_{10}O_{17}$:Eu, $Lu_3Al_5O_{12}$:Ce, $Y_3Al_5O_{12}$:Ce, $SrSi_2O_2N_2$:Eu, $Ba_3Si_6O_{12}N_2$:Eu, $(Ba,Sr)_2Si_5N_8$:Eu, $CaSiAlN_3$:Eu.

12. A method according to claim 2, wherein the second ceramic toroid is light reflective.

* * * * *